United States Patent [19]

Leunissen

[11] 4,167,129

[45] Sep. 11, 1979

[54] CUT-OFF TOOL AND SUPPORT THEREFOR

[76] Inventor: Henry Leunissen, 1811 Woodland Ave., Palo Alto, Calif. 94303

[21] Appl. No.: 869,511

[22] Filed: Jan. 16, 1978

[51] Int. Cl.² ............................................. B23B 29/12
[52] U.S. Cl. ...................................... 82/36 R; 82/37
[58] Field of Search .................. 82/36 R, 37; 407/117

[56] References Cited

U.S. PATENT DOCUMENTS

| 1,187,099 | 6/1916 | Rogers | 82/36 R |
| 2,668,467 | 2/1954 | Paine | 82/36 R |
| 2,714,830 | 8/1955 | Chelf | 82/37 |

Primary Examiner—Leonidas Vlachos
Attorney, Agent, or Firm—Paul L. Hickman

[57] ABSTRACT

A cut-off tool or deep grooving tool and support therefor for use on a turning lathe, in which a cut-off tool is secured in a tool holder on a cross slide, the support being inserted between the protruding cutting end of the cut-off tool and an extending portion of the slide bed that carries the tool holder on the cross slide of the lathe. The support is longitudinally adjustable between the cut-off tool and the cross slide and has its upper end formed as a spade of narrower width than the cutting edge of the cut-off tool, and transfers the cutting forces on the cutting edge directly to the cross slide bed. The lower edge of the cut-off tool and the upper surface of the spade portion of the support are supplied with co-operating male and female profiles to ensure constant centering of the spade formed end of the support relative to the cut-off tool.

8 Claims, 5 Drawing Figures

CUT-OFF TOOL AND SUPPORT THEREFOR

BACKGROUND OF THE INVENTION

The present invention relates to lathe cut-off tools in general and more particularly to improvements in cut-off tools and supports therefor for use in cutting off or parting off large diameter materials on a lathe or in cutting deep grooves into material on a lathe.

In utilizing a cut-off tool on a lathe for parting off large diameter stock, it is usual to fasten the cut-off tool in a tool in a tool holder in such a manner that the cut-off tool protrudes from the tool holder with sufficient overhang to permit the cutting edge of the cut-off tool to reach the center of the material being cut off.

Cutting forces on the cutting edge of the cut-off tool, during the cutting operation, tend to produce vibration in the extended portion of the cut-off tool, such vibration easily causing the cutting edge to dig into the material being cut off, which often results in tool breakage. In order to avoid such tool breakage it is usual to reduce the rate of feed as the cut-off tool reaches deeper into the material being cut off, the whole making such an operation hazardous and time consuming.

It is an object of this invention to provide a novel cut-off tool and support therefor, that may be utilized on any conventional type of lathe as well as on any special lathe.

It is another object of this invention to provide a cut-off tool and support therefor that may be easily utilized by any lathe operator without requiring any special skill for such utilization.

It is a further object of this invention to provide a cut-off tool and support therefor, as above, that may be utilized in conjunction with any conventional cut-off tool, requiring only a minor modification of the lower edge of the cut-off tool.

It is another object of this invention to provide a cut-off tool and support therefor, as above, that is quickly and readily adjustable to suit any distance between cut-off tool and cross slide bed, within the dimensional limitations of the particular support.

It is still another object of this invention to provide a cut-off tool and support therefor, that may be located directly below the cutting edge of the cut-off tool.

It is another object of this invention to provide a cut-off tool and support therefor, as above, that permits comparatively fast in-feed of the cut-off tool with minimal danger of tool breakage.

It is another object of this invention to provide a cut-off tool and support therefor, that may be supplied with a self-aligning base shoe, able to conform to varying angles between cut-off tool and bed of cross slide.

It is another object of this invention to provide a cut-off tool, and support therefor, that eliminates the tendency of the cut-off tool to vibrate during the cut-off operation, particularly in cutting off large diameter material.

It is another object of this invention to provide a cut-off tool and support therefor, that is simple in construction, easy to locate in place and inexpensive to manufacture.

These and other objects and features will become apparent when taken in conjunction with the following drawings in which.

DESCRIPTION OF THE PREFERRED EMBODIMENTS

Figure 1:
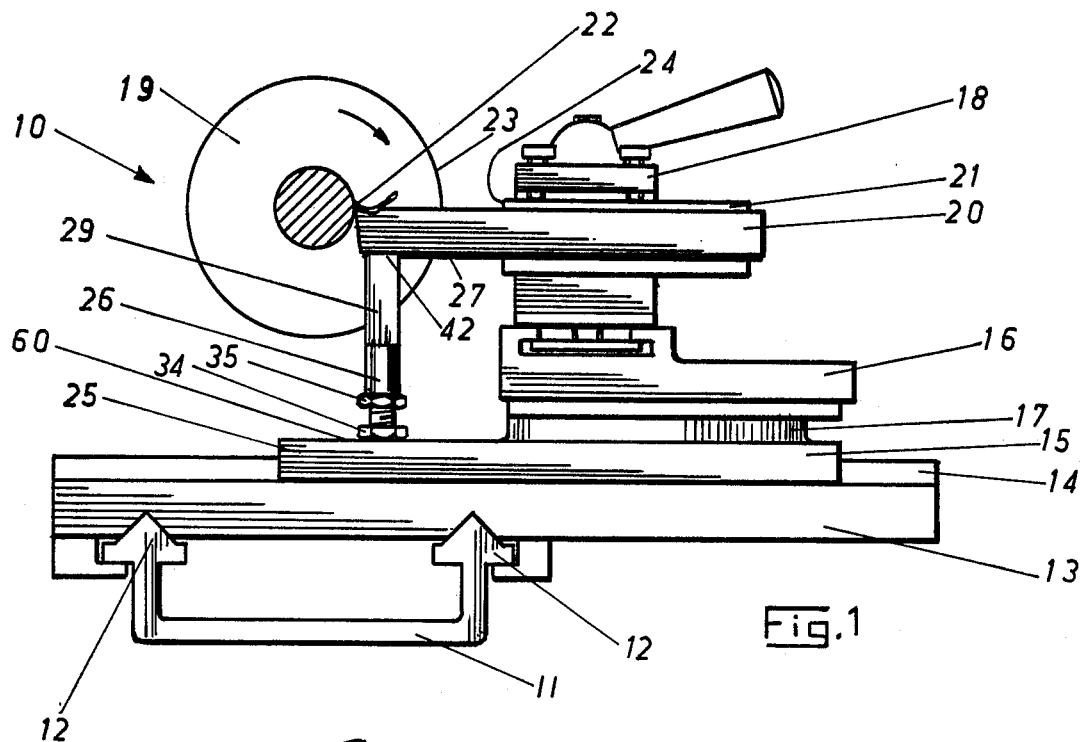
FIG. 1 is a side elevational view of a cut-off tool, held in a tool holder on a conventional lathe, showing a support embodying this invention located between the cut-off tool and the bed of the cross slide, a workpiece in the lathe being shown in section taken at right angles to the axis of rotation of the workpiece.

Referring to FIG. 1, a cut-off tool and support therefor, embodying the present invention are shown generally at 10, mounted in working position on a lathe having a lathe bed 11 provided with ways 12 upon which a main slide 13 is longitudinally slideable. Main slide 13 is provided with cross slide ways 14 carrying a cross slide 15, movable perpendicular to lathe bed ways 12 on cross slide ways 14. A conventional compound slide 16 to movably and rotatably mounted on platform 17 of slide 15 in conventional manner and carries a toolmount 18, fastened thereto in conventional manner. A work piece 19 is conventionally mounted in a work piece holder (not shown) of the lathe and is adapted to rotate about a horizontal axis, parallel to lathe ways 12, in a clock wise direction as viewed in FIG. 1. A cut-off tool 20 is shown located in a cut-off tool holder 21, cut-off tool 20 extending far enough out from cut-off tool holder 21 to permit cutting edge 22 of cut-off tool 20 to reach fully to the center of work piece 19 without outer surface 23 of work piece 19 impinging upon end 24 of cut-off holder 21. Cross slide 15 extends forward of platform 17 to a position below work piece 19 in conventional manner as shown at 25.

Figure 2:
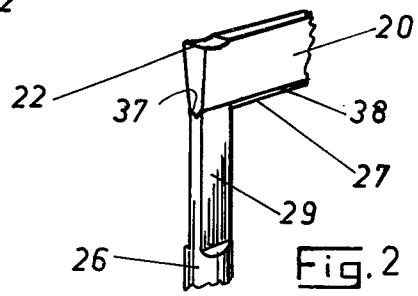
FIG. 2 is a fractional, perspective view of a cut-off tool and support therefor, showing one embodiment of the present invention.
Figures 3, 4:
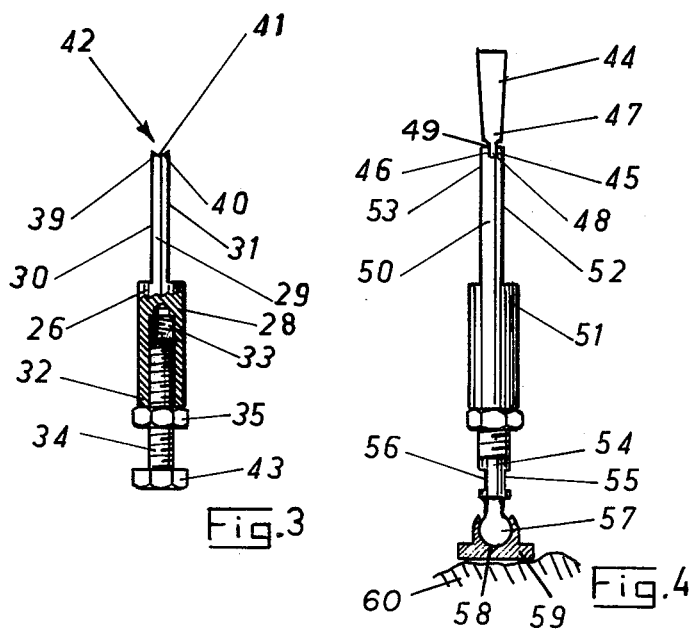
FIG. 3 is a part sectional, end elevational view of the cut-off tool support portion, shown in FIG. 2.
FIG. 4 is a part sectional, end elevational view of a second embodiment of the present invention, showing a cut-off tool and support therefor with a widened spade portion located at the upper end of the support.

Referring now to FIGS. 1, 2 and 3, a cut-off tool support 26, illustrating one embodiment of this invention, is shown inserted between extending portion 25 of cross slide 15 and lower edge 27 of cut-off tool 20. Support 26 comprises an elongate body portion 28 having at it's upper end 29 two opposing flat portions on two opposing sides 30 and 31, flattened to provide a spade configuration that in its whole vertical length is narrower than the width of cutting edge 22. Lower end 32 is supplied with an axial, threaded bore 33, a bolt 34 being screwed into threaded bore 33 and maintained in a selected position by a locknut 35.

Cut-off tool 20 is supplied with centering means 38 at its lower edge 27, comprising in this embodiment, 2 convexly bevelled edges 39 and 40 located in upper surface 41 of spade formed upper end 29, parallel with sides 30 and 31, providing a nesting slot 42 in upper surface 41. Head 43 of bolt 34 rests on slide extension portion 25 and bolt 34 is adjustable in and out of threaded bore 33 to provide that support 26 is firmly held between cut-off tool 20 and cross slide extension portion 25 upon lower edge 27 being nested in concave slot 42, upon cut-off tool cutting edge 22 being correctly positioned for cut-off operation on workpiece 19.

During cut-off operation, cutting forces, acting on cutting edge 22, are transferred directly down through slot 42, upper end 29, body 28, bolt 34 and bolthead 43, onto cross slide extension portion 25 which, through correct adjustment of bolt 34 in threaded bore 33 to provide suitable tension between cross slide extension portion 25 and cut-off tool 20, will counteract any tendency for vibration that may be set up at cutting edge 22 of cut-off tool 20 and therefore will facillitate smooth cut-off action as work piece 19 is parted off without necessitating undue reduction of feed-in rate of cutting edge 22 as it progresses into work piece 19.

Since upper end 29 of support 26 is narrower than the width of cutting edge 22, sides 30 and 31 of upper 29 will not drag on workpiece 19 as cut-off tool 20 is moved into workpiece 19 during cut-off operation, permitting upper end 29 to constantly support cut-off tool 20 directly below cutting edge 22 and thereby constantly counteract vibration during the complete parting off operation.

Referring to FIG. 4, a second embodiment of the present invention is shown, comprising a cut-off tool 44 having two opposing, parallel flats 45 and 46 formed longitudinally along lower edge 47 of cut-off tool 44, forming a downwardly depending tongue 48, a corresponding groove 49 being located in upper spadeformed end 50 of support 51, parallel to flat sides 52 and 53 of spadeformed end 50. Tongue 48 is a friction fit in groove 49 and centers cut-off tool 44 firmly on support 51, relative to sides 52 and 53 of spade portion 50.

A further modification of the cut-off tool support is also shown in FIG. 4, comprising an adjustment screw 54, supplied with opposing flats 55 and 56 to permit use of a wrench, engaging in flats 55 and 56 for adjustment of screw 54, external end of screw 54 being supplied with a ball head configuration 47, seated in a ball socket 58 in a swivelpad 59 to permit pad 59 to conform to an uneven surface 60 of cross slide extension portion 25 and to permit groove 49 to be lodged firmly and parallel to and onto tongue 48, even though lower edge 47 of cut-off tool 44 may not be parallel to upper surface 60 of cross slide extension portion 25.

Figure 5:
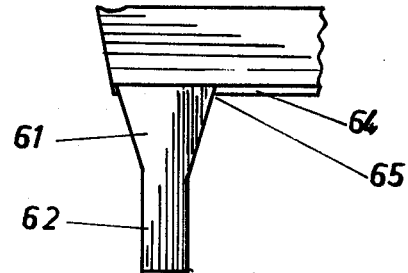
FIG. 5 is a partially broken side elevational view of another embodiment of a cut-off tool and support therefor in accordance with the present invention

Referring to FIG. 5, a further modification of the upper spade portion 61 of a support, embodying this invention is shown, comprising a widened upper spadeformed portion 62 of cut-off tool support 63, thereby facilitating lodging lower edge 64 into slot 65 of spade portion 61 in parallel relationship to each other.

It will be understood that although specific embodiment of the invention have herein been described and illustrated, the invention also contemplates variations in design as may hold within the scope of the appended clams.

I claim:

1. A cut-off tool and support therefor comprising:
   an elongated cut-off tool means having a first end, a second end, an upper edge, a lower edge and a maximum width, where said upper edge includes a cutting portion proximate said first end and said lower edge is provided with a centering means extending at least partially from said first end to said second end; and
   support means including
   an elongated body section having a first end with an elongated surface profile that is slidingly matable with said centering means and having a spade portion extending from said first end at least partially to a second end thereof having a dimension taken perpendicularly to said elongate surface profile that is less than said maximum width, and
   swivel base means coupled to said second end of said body section having a planar contact surface that is always in substantially flat contact with a support surface.

2. A cut-off tool and support therefor as recited in claim 1 wherein said swivel base means includes
   a threaded shaft having a portion of its length proximate a first end thereof disposed within a threaded, axial bore that extends inwardly from said second end of said elongated body section and having a second end thereof formed into a ball end, and
   a substantially flat swivel pad having a top surface provided with a ball socket engagable with said ball end and a bottom surface defining said contact surface.

3. A cut-off tool and support therefor as recited in claim 2 wherein
   said threaded shaft is provided with a pair of opposing, flattened surface for engagement with an adjustment wrench.

4. A cut-off tool and support therefor as recited in claim 2 wherein said swivel base means further includes locknut means threaded upon said shaft.

5. A cut-off tool and support therefor as recited in claim 1 wherein
   said centering means is a tongue of material projecting from said lower edge, and
   said surface profile is a groove receptive to said tongue of material.

6. A cut-off tool and support therefor as recited in claim 5 wherein
   both said tongue of material and said surface profile are substantially of a V shaped cross section.

7. A cut-off tool and support therefore as recited in claim 5 wherein
   both said tongue of material and said surface profile are substantially of rectangular cross section.

8. A cut-off tool and support therefor as recited in claim 1 wherein
   a part of said spade portion terminating at said first end has a dimension taken parallel to said elongated surface profile that is greater than a dimension taken parallel to said elongated surface profile of the remainder of said spade portion.

* * * * *